3,741,950
METHOD FOR HARDENING GELATIN
Mitsunori Sugiyama, Reiichi Ohi, Tadao Shishido, and Masaki Omura, Ashigara-machi, Japan, assignors to Fuji Photo Film Co., Ltd., Nakanuma, Minami Ashigara-shi, Kanagawa, Japan
No Drawing. Filed July 2, 1971, Ser. No. 159,519
Claims priority, application Japan, July 2, 1970, 45/57,911
Int. Cl. C09h 7/00
U.S. Cl. 260—117                         14 Claims

ABSTRACT OF THE DISCLOSURE

A method for hardening proteins using as the hardener at least one compound of the general formula

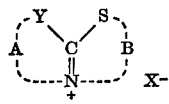

wherein A and B are necessary atoms for forming a heterocyclic ring, Y represents sulfur or selenium and X stands for an anion, is disclosed. The hardening effects of the compounds are further potentiated when used in combination with at least one metal ion such as manganese, cobalt, nickel, copper, zinc, silver or cadmium ion.

FIELD OF THE INVENTION

This invention relates to a method of protein hardening and, more particularly, to a method of protein hardening using certain organic compounds and to a method of protein hardening using the organic compounds and, in combination therewith, metal ions.

BACKGROUND OF THE INVENTION

It has been well known in the art that proteins are hardened by various organic compounds such as formalin or other aldehydes, chlorotriazines and mucochloric acid. Furthermore, it is also well known that proteins may be hardened by certain metal ions such as chromium ion. These compounds are extremely important in the production of photographic materials, in particular as hardeners for gelatin, but employment of them as the hardeners is attended by a number of drawbacks such as their too slow hardening effect, their poor shelf life, or their fogging action on photographic emulsions as shown in aldehydes. Under these circumstances, it has been desired to develop new hardeners eliminating these defects.

DETAILED EXPLANATION OF THE INVENTION

As a result of our detailed study of the hardening action of various kinds of organic compounds on proteins, we have now found that cyclic compounds containing therein the following linkage:

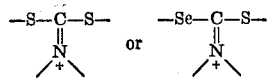

show an excellent hardening action on proteins, and also that the hardening action is remarkably enhanced in the presence of metal ions.

An object of the persent invention is, therefore, to provide an advantageous protein hardening method using the compounds having the novel functional groups described above.

Thus, the present invention provides a method of protein hardening using the compounds represented by the following general Formula I:

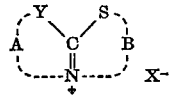

wherein A and B each represents necessary nonmetal atoms for forming a heterocyclic ring, Y represents sulfur or selenium and X stands for an anion.

Furthermore, the present invention provides a method of protein hardening using the compounds represented by the above-described Formula I in combination with metal ions.

Typical examples of the compounds of general Formula I are illustrated in the following (these compounds are hereinafter referred to by the numbers set forth below):

| Compound | | Melting point, °C. |
|---|---|---|
| 1 | (structure with S–S, N+, Br−) | 258 |
| 2 | (structure with S–S, N+, Br−) | 288 |
| 3 | (structure with S–S, N+, Br−) | 260 |
| 4 | S=, H₃C—N—N+, S–S, Br− | 267 |
| 5 | H₃CS—, S–S, N—N+, Br− | 275 |
| 6 | (structure with Se–S, N+, Br−) | 288 |
| 7 | H₃C—, S–S, N+, Br− | 235 |
| 8 | Cl—, S–S, N+, Cl− | 291 |
| 9 | CH₃—C(=O)—N(H)—, S–S, N+, Cl− | 305 |

The compounds according to the present invention may be, in general, readily prepared by reacting, under heating to about 160° C., an azole compound having a methylmercapto group with ethylene bromide or 1,3-dibromopropane.

Synthesis 1 (Compound 1)

A mixture of 16 g. of 2-methylthiobenzothiazole and 20 g. of ethylene bromide was heated at a temperature of 160° C. for 4 hours. The crystals formed upon cooling were collected by filtration and then recrystallized from ethanol to obtain 17 g. of the product as needles melting at 258° C.

Synthesis 2 (Compound 3)

A mixture of 16 g. of 2-methylthiobenzothiazole and 25 g. of 1,3-dibromopropane was heated at a temperature of 160° C. for 4 hours. After cooling, the precipitated crystals were filtered off and then recrystallized from ethanol to obtain 14 g. of the product as needles melting at 260° C.

Synthesis 3 (Compound 6)

A mixture of 20 g. of 2-methylthiobenzoselenazole and 20 g. of ethylene bromide was heated at a temperature of 160° C. for 4 hours. After cooling, the precipitated crystals were collected by filtration to obtain 18 g. of the product as needles melting at 288° C.

Alternatively, the Compounds 8 and 9 may be prepared in a manner as described in Chemical Abstracts, vol. 72, page 31, 666 (1970).

The anion in general Formula I is not limited and any anion may be used. It is immaterial to the hardening action of the compound.

The compounds of the invention represented by the general Formula I show a stronger hardening action when used in an alkaline atmosphere.

The protein hardening method according to the present invention may be applied to various fields. For example, it may be utilized as hardener for photographic silver halide-gelatin light-sensitive materials.

When the compounds of the present invention are added to gelatin which is a water-soluble protein, the gelatin is made hardly soluble in hot water, which phenomenon results from cross-linking reaction of the gelatin caused by the compounds. Such hardening action is particularly remarkable when the compounds of the invention and metal ions are concurrently employed, and addition of both the compounds of the invention and metal ions into an aqueous gelatin solution is immediately followed by cross-linking reaction to cause gelation. In some cases, although gelation was not shown, an outstanding viscosity increase was observed.

In the present invention, even trace amounts of metal ions are sufficient to enhance the hardening action of the compounds of the invention and the amounts thereof added are limited only by their solubility in water. Optimum amounts to be added may be readily determined by means of a simple preliminary test. Metals such as manganese, cobalt, nickel, copper, zinc, silver and cadmium have been found to show particularly significant action.

Particularly preferred results may be obtained when the compounds according to the invention are employed for the purpose of hardening gelating of a photographic silver halide emulsion layer. The suitable amounts of the compounds of the invention to be added depends on the time or point of addition, i.e. adding to the photographic emulsion before coating or adding to the processing solution, or upon other conditions, although, in general, from 1 mg. to 10 g. and, more specifically, from 10 mg. to 500 mg., per 4.5 g. dry gelatin is suitable. In some cases, however, amounts which are outside this range may be added. Optimum amounts may be suitably determined by a simple preliminary test. Emulsions containing hardeners according to the present invention may be applied to any support capable of forming photographic light-sensitive materials, examples of such support being cellulose ester film, polyethylene terephthalate film, paper, cloth, glass plate and metal plate. The emulsions hardened with the compounds of this invention exhibit a tendency to be firmly bonded to the support even at such high temperatures that usual emulsions would be dissolved in a processing solution and/or stripped from the support. Particularly preferred results may be obtained when the processing is effected at high temperatures, for example, from 30 to 80° C.

The compounds according to the instant invention may be used in a variety of photographic gelatin-silver halide emulsions. For example, they may be used in black-and-white light-sensitive materials such as X-ray emulsions, positive emulsions, negative emulsions optically sensitized with sensitizing dyes and reversal emulsions, as well as in multi-layer color light-sensitive materials such as incorporated-coupler type color light-sensitive materials incorporating therein nondiffusible couplers, multi-layer color light-sensitive materials incorporating therein no couplers and, as disclosed in U.S. Pats. Nos. 2,559,643, 2,698,798 and 3,227,551, etc., color diffusion transfer light-sensitive materials wherein a developing composition, coupler or dye may be diffused image-wise through and between an exposed layer and image-receiving layer.

As silver halide emulsions, there may be employed photographic emulsions comprising silver bromide, silver iodide, silver chloride or mixed silver halides, i.e. silver bromoiodide, silver chlorobromide, silver chloroiodobromide or the like. The silver halide emulsions may be chemically sensitized with a labile sulfur-containing compound such as sodium thiosulfate and allylthiocarbazide, a gold compound such as a complex salt of gold (I) with thiocyanic acid, a reducing agent such as stannous chloride, a polyalkylene oxide derivative or combinations thereof. Furthermore, the silver halide emulsions may be optically sensitized with a cyanine dye such as 1,1'-diethylcyanine iodide and anhydro-5,5'-diphenyl-9-ethyl-3,3'-di(2-sulfoethyl)-benzoxazolocarbocyanine hydroxide, which may be used alone or as a mixture thereof. Furthermore, the silver halide emulsions may contain a stabilizer such as 4-hydroxy - 6 - methyl-1,3,3a,7-tetrazaindene, benzimidazole and 1-phenyl-5-mercaptotetrazole, a hardener such as formaldehyde and mucochloric acid and/or a coating aid such as sodium alkylbenzene sulfonate.

The present invention will be further explained with reference to the following examples using some of the typical compounds of the invention.

EXAMPLE 1

The compounds of the invention identified above were each added, in amounts shown in the table below, to 10 cc. of 10% aqueous gelatin solution kept at a temperature of 35° C., and thereafter 0.8 cc. of a 0.1 N aqueous silver nitrate solution was added to the respective mixtures, followed by stirring. Thereafter, 0.8 cc. of a 0.1 N aqueous sodium hydroxide solution was added and stirred at a temperature of 35° C., and the respective gelatin solutions were examined for changes, thereby giving the following results.

| Compound | Amount added, mg. | Changes in gelatin solution |
| --- | --- | --- |
| 1 | 50 | Gelled. |
| 2 | 20 | Do. |
| 3 | 60 | Do. |
| 4 | 60 | Do. |
| 5 | 50 | Do. |
| 6 | 50 | Do. |
| 7 | 80 | Very viscous. |
| 8 | 60 | Gelled. |
| 9 | 60 | Do. |

For a comparison test, the same procedures were followed except that the compounds of the invention were excluded. No changes in the gelatin solutions were observed.

EXAMPLE 2

The samples used in experiments of this example were prepared by adding the compounds of the invention identified above and methanol, in amounts shown in the table below, into a 5% aqueous gelatin solution, applying 7 cc. of the respective mixtures to undercoated glass plates of cabinet size, setting them at a temperature of 10° C. and thereafter air-drying them overnight at a temperature of 20° C.

| Sample | Compound— 1 [1] | 2 [1] | 3 [1] | Methanol [2] |
|---|---|---|---|---|
| 1 | 0 | 0 | 0 | 2 |
| 2 | 2 | 0 | 0 | 0 |
| 3 | 1 | 0 | 0 | 1 |
| 4 | 0.5 | 0 | 0 | 1.5 |
| 5 | 0 | 2 | 0 | 0 |
| 6 | 0 | 1 | 0 | 1 |
| 7 | 0 | 0.5 | 0 | 1.5 |
| 8 | 0 | 0 | 2 | 0 |
| 9 | 0 | 0 | 1 | 1 |
| 10 | 0 | 0 | 0.5 | 1.5 |

[1] Amounts of 0.1 mol methanol solution added into 25 cc. of a 5% aqueous gelatin solution, cc.
[2] Amounts added into 25 cc. of a 5% aqueous gelatin solution, cc.

The melting points of the respective samples thus prepared were measured in the following three manners, thereby obtaining the results summarized in the following table.

Measuring methods:
(a) Measured in distilled water.
(b) Measured in a 0.1 N sodium hydroxide solution.
(c) Measured in a 0.1 N aqueous sodium hydroxide solution, after dipping in a 0.1 N aqueous silver nitrate solution at 20° C. for 5 minutes and thereafter rinsing with distilled water.

| Sample | Melting point (° C.) (a) | (b) | (c) |
|---|---|---|---|
| 1 | 31 | 24 | 24 |
| 2 | 38.5 | 30 | 48.5 |
| 3 | 37 | 29 | 39 |
| 4 | 37 | 28 | 33 |
| 5 | 39.5 | 35 | 52.5 |
| 6 | 39.5 | 33 | 40 |
| 7 | 38.5 | 30.5 | 38 |
| 8 | 36.5 | 28 | 37 |
| 9 | 36 | 27 | 36 |
| 10 | 35 | 26 | 32 |

As is evident from the above table, the addition of the compounds of the invention give rise to hardening effects, resulting in elevation of the melting points. Furthermore, these results indicate that, when the compounds of the invention are employed in combination with metal ions, their hardening effects are remarkably increased, which is evident from an outstanding increase in the melting points as compared with those in the case where the compounds of the invention are employed alone.

EXAMPLE 3

30 mg. of each inorganic compound described in the following table was dissolved into 10 cc. of a 10% aqueous gelatin solution kept at a temperature of 35° C., and thereafter 80 mg. of Compound 1 was added. Thereafter, 1 cc. of a 0.1 N aqueous sodium hydroxide solution was added and the respective mixtures were stirred at a temperature of 35° C., while changes in the aqueous gelatin solutions were observed, thereby obtaining the results summarized in the following table.

| Inorganic compound: | Changes in gelatin solution |
|---|---|
| $CoCl_2 \cdot 6H_2O$ | Gelled. |
| $NiSO_4 \cdot 7H_2O$ | Gelled. |
| $CdSO_4$ | Gelled. |
| $ZnSO_4 \cdot 7H_2O$ | Very viscous. |
| $CuCl_2 \cdot 2H_2O$ | Very viscous. |
| $MnSO_4 \cdot 6H_2O$ | Very viscous. |

In the corresponding cases where Compound 1 was not added, there were observed no changes in the aqueous gelatin solution.

EXAMPLE 4

A sulfur-senstized and gold-sensitized high speed photographic negative emulsion containing, per kg. emulsion, 40 g. of silver iodobromide (3.5 mol percent silver iodide content) and 45 g. of gelatin, was heated at a temperature of 40° C. to dissolve the same and then divided into several portions into which the compounds shown in the table below were added in amounts also shown in the table. The respective composition thus obtained was then applied onto a cellulose triacetate base in thickness of 4μ, followed by drying.

The melting points of the respective samples thus prepared were measured in a 0.2 N aqueous sodium hydroxide solution, thus giving the results shown in the table below.

| Sample | Compound | Amounts (mg./100 g. emulsion) | pH of emulsion | Melting point (° C.) |
|---|---|---|---|---|
| 1 | 1 | 500 | 6.5 | 65.5 |
| 2 | 2 | 10 | 6.5 | 35.5 |
| 3 | 3 | 50 | 6.5 | 35 |
| 4 | 4 | 100 | 6.5 | 43.5 |
| 5 | 5 | 100 | 6.5 | 44 |
| 6 | 6 | 200 | 6.5 | 48 |
| 7 | 7 | 80 | 6.5 | 34 |
| 8 | 8 | 100 | 6.5 | 41.5 |
| 9 | 9 | 50 | 6.5 | 36 |
| 10 | | | 6.5 | 26.5 |

As is shown by the above-described results, the addition of the compounds of the invention evidently increased hardening of the gelatin as shown by the increase of melting point. Furthermore, deleterious influences, resulting from the addition of the compounds of the invention, upon photographic properties, i.e. sensitivity, fog or the like, were hardly observed.

Although there were employed in the examples specified Compounds 1 to 9, the same hardening effect was also obtained with other compounds represented by the general Formula I.

What is claimed is:

1. A method for hardening gelatin, characterized by using at least one compound of the general Formula I

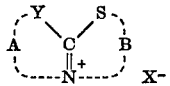

wherein A and B each represents necessary nonmetal atoms for forming a heterocyclic ring, Y represents sulfur or selenium and X stands for an anion.

2. A method for hardening gelatin, characterized by using a combination of at least one compound of the general Formula I

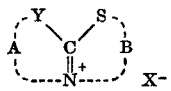

wherein A and B each represent necessary nonmetal atoms for forming a heterocyclic ring, Y represents sulfur or selenium and X stands for an anion, and at least one metal ion.

3. The method as claimed in claim 1 wherein said compound is of the formula

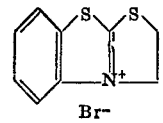

4. The method as claimed in claim 1 wherein said compound is of the formula

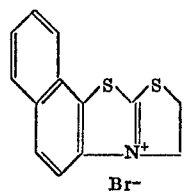

5. The method as claimed in claim 1 wherein said compound is of the formula

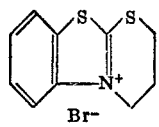

6. The method as claimed in claim 1 wherein said compound is of the formula

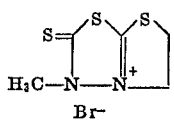

7. The method as claimed in claim 1 wherein said compound is of the formula

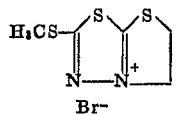

8. The method as claimed in claim 1 wherein said compound is of the formula

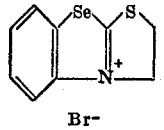

9. The method as claimed in claim 1 wherein said compound is of the formula

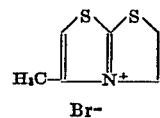

10. The method as claimed in claim 1 wherein said compound is of the formula

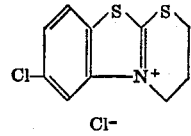

11. The method as claimed in claim 1 wherein said compound is of the formula

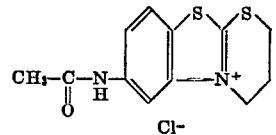

12. The method as claimed in claim 1 wherein said gelatin is of a photographic light-sensitive material and the amount of said compound is 1 mg. to 10 g. per 4.5 g. of gelatin.

13. The method as claimed in claim 1 wherein said gelatin is of a photographic light-sensitive material and an amount of said compound is 10 mg. to 500 mg. per 4.5 g. of gelatin.

14. The method as claimed in claim 2, wherein said metal is manganese, cobalt, nickel, copper, zinc, silver or cadmium.

References Cited

UNITED STATES PATENTS 3,679,428    7/1972    Shiba et al. _____ 96—124

OTHER REFERENCES

Chem. Abstracts, vol. 54, 1960, 2063a–b, Lifshits et al.

HOWARD E. SCHAIN, Primary Examiner

U.S. Cl. X.R.

96—111